(12) United States Patent
Gröhn

(10) Patent No.: US 7,248,802 B2
(45) Date of Patent: Jul. 24, 2007

(54) DISTRIBUTION OF A SYNCHRONIZATION SIGNAL IN AN OPTICAL COMMUNICATION SYSTEM

(75) Inventor: Aki Gröhn, Espoo (FI)

(73) Assignee: Nokia Corporation, Espoo (FI)

( * ) Notice: Subject to any disclaimer, the term of this patent is extended or adjusted under 35 U.S.C. 154(b) by 537 days.

(21) Appl. No.: 10/305,405

(22) Filed: Nov. 27, 2002

(65) Prior Publication Data

US 2004/0101311 A1 May 27, 2004

(51) Int. Cl.
*H04B 10/00* (2006.01)

(52) U.S. Cl. ............... 398/155; 398/154; 398/202; 398/182; 398/183; 398/208; 398/209; 398/214; 398/66; 398/67; 398/68; 398/70; 398/71; 398/72; 398/98; 398/100; 398/140; 398/141; 370/503; 370/516; 375/354; 375/356; 375/362; 375/328; 455/502; 455/503; 455/427

(58) Field of Classification Search .......... 398/182, 398/183, 185, 186, 187, 192, 193, 194, 195, 398/196, 197, 198, 202, 206, 154, 155, 66, 398/67, 68, 70, 71, 72, 98, 100, 208, 214, 398/209, 140, 141; 370/503, 516; 375/354, 375/356, 362, 352, 328; 455/502, 503, 427
See application file for complete search history.

(56) References Cited

U.S. PATENT DOCUMENTS

| | | | | | |
|---|---|---|---|---|---|
| 4,435,850 | A | * | 3/1984 | Bowen et al. | 398/40 |
| 4,611,352 | A | * | 9/1986 | Fujito et al. | 398/159 |
| 5,444,561 | A | * | 8/1995 | Kaminishi | 398/155 |
| 5,477,366 | A | * | 12/1995 | Moss et al. | 398/154 |
| 6,008,919 | A | * | 12/1999 | Watanabe | 398/79 |
| 6,046,838 | A | * | 4/2000 | Kou et al. | 359/245 |
| 6,470,032 | B2 | * | 10/2002 | Dudziak et al. | 370/503 |
| 7,024,121 | B2 | * | 4/2006 | Rikitake et al. | 398/154 |
| 2001/0001616 | A1 | | 5/2001 | Rakib et al. | |

FOREIGN PATENT DOCUMENTS

WO WO 96/31962 10/1996

* cited by examiner

*Primary Examiner*—Hanh Phan

(57) ABSTRACT

The invention relates to the distribution of a synchronization signal in an optical communication system which is inherently asynchronous. In order to accomplish a cost-efficient mechanism for transmitting a synchronization signal in such a system, the amplitude of a payload signal is modulated with the synchronization signal, whereby an amplitude-modulated payload signal is obtained. This amplitude-modulated payload signal is transmitted as an optical signal to the opposite end of an optical link, where the synchronization signal is separated from the payload signal.

18 Claims, 4 Drawing Sheets

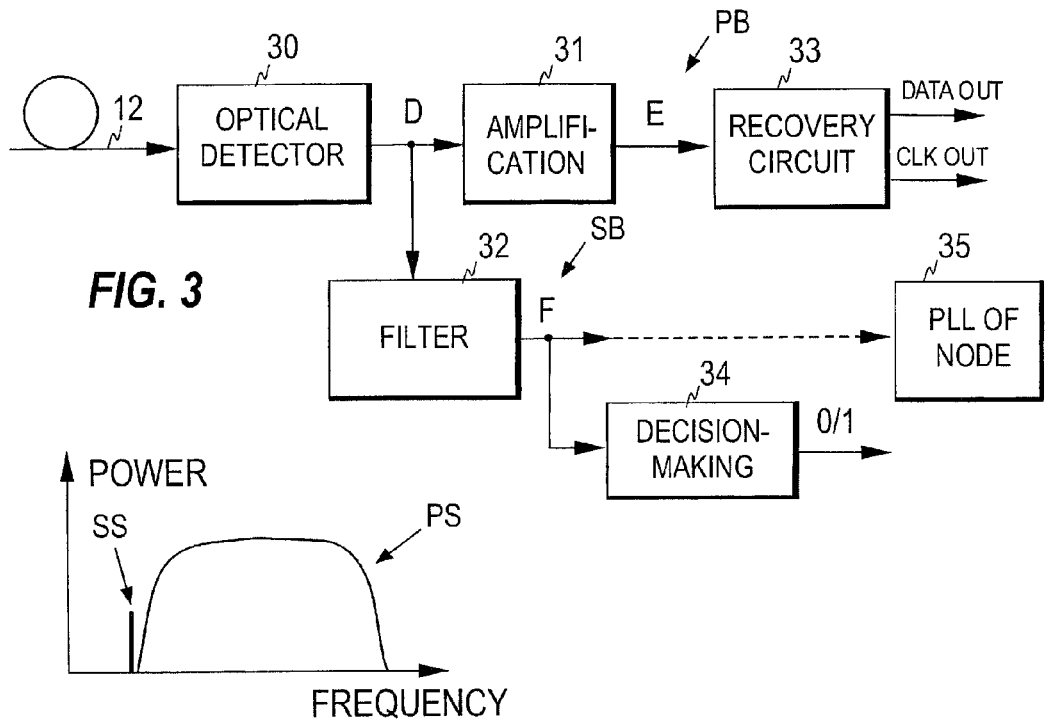
FIG. 3
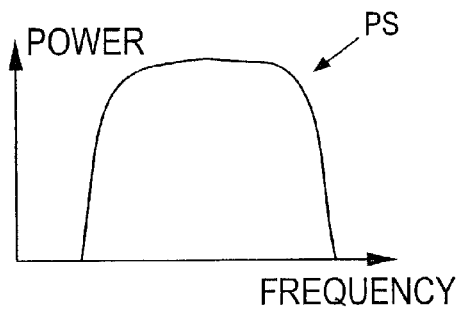
FIG. 4a
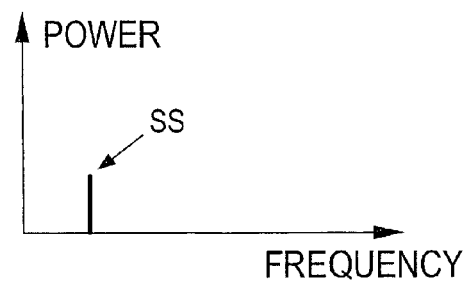
FIG. 4b
FIG. 4c
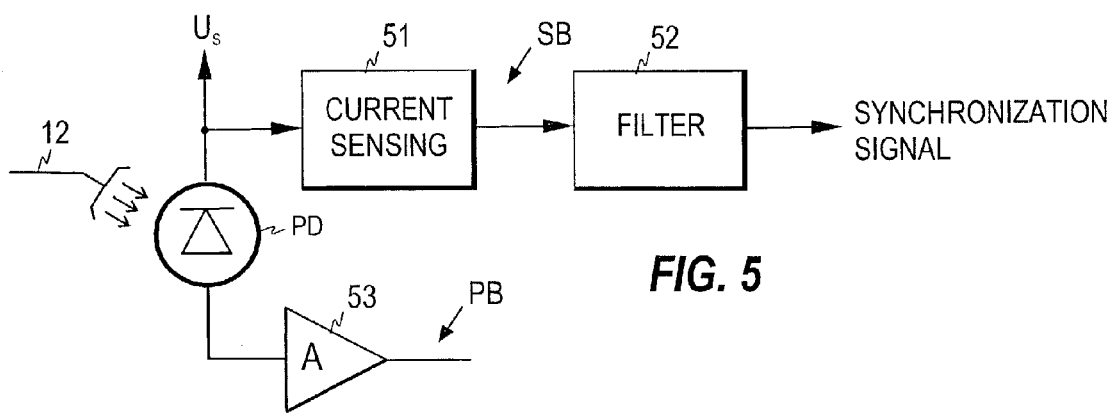
FIG. 5

DISTRIBUTION OF A SYNCHRONIZATION SIGNAL IN AN OPTICAL COMMUNICATION SYSTEM

BACKGROUND OF THE INVENTION

1. Field of the Invention

The invention relates generally to the transfer of a synchronization signal in an optical communication system. The invention is intended particularly for optical Ethernet systems, which have no inherent mechanism for distributing a synchronization signal within the system.

2. Description of the Related Art

In many networks the distribution of an exact frequency reference is mandatory. This is the case, for example, in radio access networks where a synchronization signal needs to be delivered to the base stations. The traditional, synchronous transmission technologies like PDH or SDH/SONET include this feature.

Recently, due to advances in optical Ethernet technology, this well-established LAN technology has also been introduced into Metropolitan Area Networks (MAN) and Wide Area Networks (WAN). The main reasons for the extension of the Ethernet technology beyond the LANs are its cost-effectiveness, i.e. low cost combined with simplicity and speed, which makes it suitable for carrying data traffic.

However, Ethernet is an asynchronous technology which does not support the distribution of a synchronization signal between the nodes. Therefore, there is no specified way or mechanism in an Ethernet-based optical communication system for the distribution of a synchronization signal. The Ethernet nodes have been designed to operate in their own clock domains, i.e. the clocks of the nodes are not locked to any high precision master clock. Since an Ethernet network is asynchronous, the clock recovered in a node cannot be used as a synchronization signal, as is the case in synchronous networks. However, the distribution of a synchronization signal can be introduced into an optical Ethernet system if extra measures are taken. This is discussed briefly in the following.

The synchronization signal can be transported over the link in a copper Ethernet (e.g. 10Base-T or 100Base-T) using an extra line or line pair, such as a twisted pair cable. For reasons of cost, this method is not desirable when the physical medium is an optical fiber.

In the optical Ethernet, the transmitting clock of a node can be locked to an external high precision clock source acting as a master clock, whereby the synchronization signal can be transmitted over an optical link to a neighboring node. However, one drawback of this method is that it requires an additional channel for informing the receiving party about the validity of the master clock source. Due to failures, for example, the master clock source may not always be available. When this occurs, the transmitting clock starts to drift, and soon the frequency reference may no longer be acceptable. Therefore, information about the locking state, whether the transmitting clock is locked or not, has to be transmitted to adjacent nodes using higher layer protocols, such as Ethernet MAC control layer packets, in order to inform the receiving node when the frequency reference, i.e. the synchronization signal, is invalid.

The frequency synchronization can also be provided to each Ethernet node separately, using separate synchronization lines or the Global Positioning System (GPS), for example. It is also possible to provide each node with a precise clock source. However, these are expensive solutions. Furthermore, the GPS does not work properly indoors.

As indicated above, the introduction of a frequency reference distribution system in an optical Ethernet system is at present rather complicated and/or expensive, as the additional mechanisms needed are complex or require expensive additional components. This naturally detracts from the cost-effectiveness of an optical Ethernet system, which is otherwise good.

SUMMARY OF THE INVENTION

The objective of the invention is to accomplish a solution for the above-mentioned problem. In other words, the objective of the invention is to devise a mechanism which enables uncomplicated and cost-efficient transmission of a synchronization signal over an optical Ethernet link, whereby the distribution of a synchronization signal may be introduced into an optical Ethernet system in a cost-efficient manner.

In the present invention, the known pilot tone technique is utilized to carry the synchronization signal on the same fiber as the payload signal. Pilot tones are signals which travel along the same links and through the same nodes as the payload signal, but which can be distinguished from the payload signal. Typically, the pilot tones are located at different frequencies than the payload signal. In WDM (Wavelength Division Multiplexing) systems, the pilot signals have been used for monitoring purposes, such as for detecting network continuity failures. In the present invention, the synchronization signal is transported over on optical link as a pilot signal obtained by amplitude modulating the payload signal with the synchronization signal. In this way the transportation of the synchronization signal can be introduced into the system with minimum changes, i.e. in a very cost-efficient manner.

Thus one aspect of the invention is providing a method for transporting a synchronization signal in an optical communication system, the method comprising the steps of receiving a synchronization signal and a payload signal, the synchronization signal originating from a clock source, modulating the amplitude of the payload signal with the synchronization signal, whereby an amplitude-modulated payload signal is obtained, and supplying the amplitude-modulated payload signal as an optical signal to an optical link.

The present invention enables the transportation of the frequency synchronization signal to be implemented entirely on the first layer of the OSI model. Handshaking mechanisms of higher layer protocols are thus not needed for obtaining information about the locking state of a master clock, but the validity of the synchronization signal can be verified on the said first layer. As a result of the operation on the first layer, the method enables a very fast detection of the synchronization signal.

In a further aspect the invention provides a transmitter arrangement for transmitting a synchronization signal in an optical communication system, the transmitter arrangement comprising a modulator unit including a first input for receiving a payload signal, a second input for receiving a modulating signal, and an output for outputting the payload signal as amplitude-modulated with the modulating signal, wherein said second input is operably connected to a clock source for connecting to the second input a signal originated from the clock source as said modulating signal, and wherein the transmitter arrangement comprises an optical source for transmitting the amplitude-modulated payload signal as an optical signal to an optical link.

In a still further aspect the invention provides a receiver arrangement for receiving a payload signal and a synchronization signal in an optical communication system, the receiver arrangement comprising at least one optical detector for receiving a combined signal formed by the payload signal amplitude-modulated with the synchronization signal, a first reception branch for detecting the payload signal, and a second reception branch comprising an AM detector for detecting the synchronization signal.

The invention also enables economic upgrading of the current low capacity, copper Ethernet connections with high speed optical Ethernet connections in systems where frequency synchronization needs to be transported between the nodes of the network. A further advantage of the invention is that a transmitter according to the invention is compatible with a standard receiver (i.e. a receiver not supporting the transfer of the synchronization signal), and a receiver according to the invention is compatible with a standard transmitter. This is because the system of the invention may be implemented so that the transportation of the synchronization signal does not in any way disturb the transportation of the payload signal, and vice versa.

In one embodiment of the invention, the amplitude modulation is implemented by controlling the bias current of a laser diode by means of the synchronization signal. This provides a very simple way of inserting the synchronization signal as a pilot signal into the system, since the existing transmitters are provided with bias current control. However, in existing transmitters the bias current control is used for holding the laser at the desired operation point, i.e. for compensating for the changes which temperature variations and aging cause in the power of the laser. Thus, in the preferred embodiment of the invention, the existing transceiver implementation is utilized to facilitate the introduction of the synchronization signal into the system.

Other features and advantages of the invention will become apparent through reference to the following detailed description and the accompanying drawings.

BRIEF DESCRIPTION OF THE DRAWINGS

In the following, the invention and its preferred embodiments are described more closely with reference to the examples shown in FIG. 1 to 7 in the appended drawings, wherein:

FIG. 3 illustrates the general principle of the invention in a receiver, FIGS. 4a, 4b, and 4c illustrate the spectrum of the signal at three different points in the receiver of FIG. 3, FIG. 5 illustrates an alternative embodiment for detecting the synchronization signal.

DESCRIPTION OF THE PREFERRED EMBODIMENTS

Figure 1:
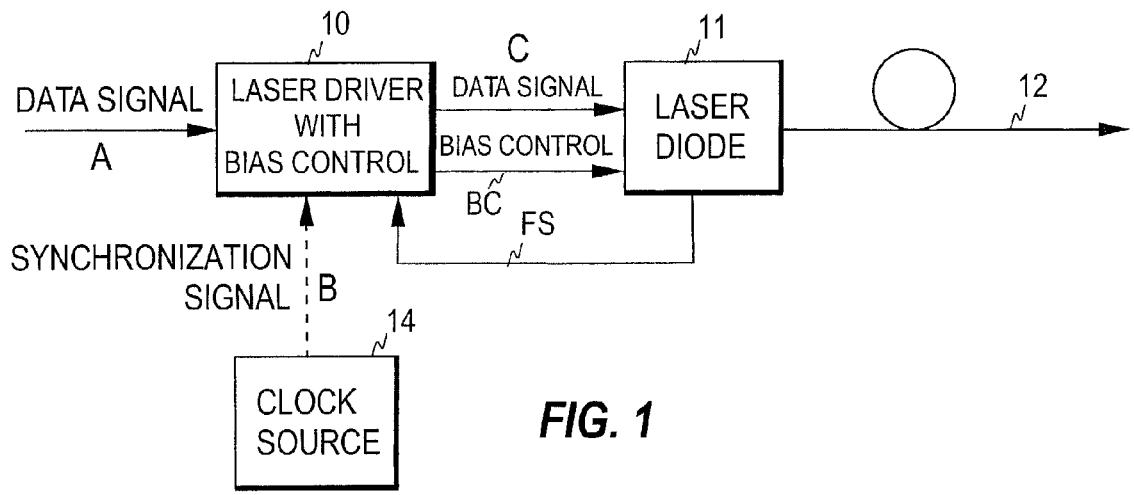
FIG. 1 illustrates the general principle of the invention in a transmitter.

According to the invention, the synchronization signal can be transported over an optical Ethernet link using the same optical media as the data traffic (i.e. the payload signal) uses. FIG. 1 illustrates a simplified structure of a transmitter to which the method of the invention is applied. In the present invention, a synchronization signal originating from a master clock 14 is inserted as a pilot signal into an optical fiber 12 by modulating the amplitude of the payload signal with the synchronization signal. The pilot signal power is preferably below the payload signal power in the frequency domain, as shown below in connection with FIGS. 2a to 2c.

An advantage of the invention is that it can be easily introduced into current optical Ethernet transceivers, even though they do not support the usage of the pilot signals. FIG. 1 illustrates an embodiment, whereby the synchronization signal received from the master clock source 14 of the system is supplied to the control input of a driver circuit 10 driving a laser diode unit 11, while the payload signal (i.e. the data signal) is supplied to the data input of the driver circuit. The driver circuit preferably includes a bias current controller, which drives the laser diode to its operation point by controlling the bias current of the diode. The controlled laser diode unit normally includes a monitoring diode (not shown) which outputs a feedback signal FS proportional to the transmission power of the laser. The operation of the bias controller is based on this feedback signal. A conventional bias controller of the driver circuit is designed to keep the laser at the desired operation point. Thus, the bias control signal supplied to the laser remains essentially constant, providing that the temperature remains constant. Consequently, the bias control signal changes slowly in comparison to the synchronization signal received from the clock source. In the present invention, the synchronization signal supplied to the driver circuit is summed with the output signal of the bias controller in order to modulate the bias current of the laser diode with the synchronization signal. The bias control signal BC shown in the figure thus represents the sum of the synchronization signal and the output signal of the bias controller. In this way, the operation point of the laser and thus also the intensity of the emitted light is made to fluctuate according to the synchronization signal. The amplitude of the fluctuation corresponds to the modulation depth used, which is typically from 3 to 6 percent, whereas the frequency of the fluctuation corresponds to the frequency of the master clock source, which acts as a frequency reference. Together with the laser diode circuit, the driver circuit thus acts as a modulator unit with respect to the payload signal and the bias current. More specifically, in addition to the normal on/off-type modulation performed for the payload signal, the driver circuit forms a control signal BC controlling the operation point of the laser so that a payload signal amplitude-modulated with the synchronization signal is obtained. The driver circuit thus acts, together with the laser diode circuit, as an AM modulator unit outputting the amplitude-modulated payload signal.

The synchronization signal and the payload signal can also be combined inside the driver circuit, whereby the driver circuit itself outputs the amplitude-modulated payload signal in electrical format and thus acts as an AM modulator, without the cooperation of the laser diode circuit.

Figure 2A:
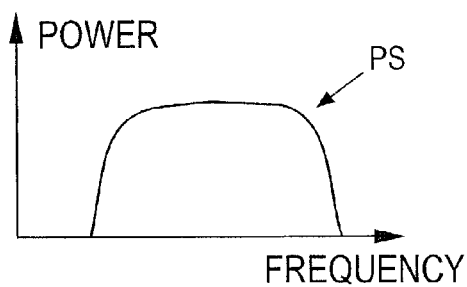
FIGS. 2a, 2b, and 2c illustrate the power spectrum of the signal at three different points in the transmitter of FIG. 1.
Figure 2B:
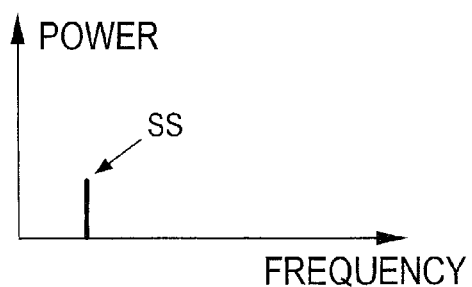
Figure 2C:
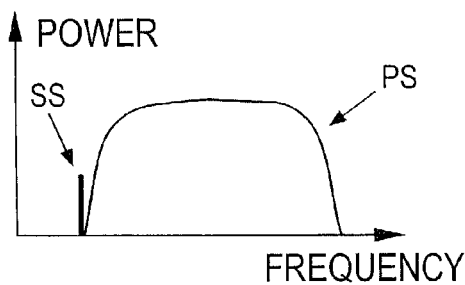

FIG. 2a, 2b, and 2c illustrate the operation principle of the frequency reference distribution of the invention by showing the power spectrum of the (electrical) signal at points A, B, and C of FIG. 1, respectively. However, it is to be noted here that the signal at point A is normally in digital format, whereas FIG. 2a illustrates the power spectrum of the corresponding analog signal. Furthermore, FIG. 2c shows the combined spectrum of the payload and synchronization signals, although the said signals are on separate lines in the embodiment of FIG. 1. The payload signal (i.e. the data signal) is denoted by the reference sign PS, while the synchronization signal is denoted by the reference sign SS.

The clock source generating the synchronization signal may be directly connected to the transmitter, or the synchronization signal may be transferred through one or more links from a remote clock source. Depending on the size of the network, the clock source may form the master clock for a various number of nodes. The frequency of the synchronization signal preferably depends on the rate of the payload signal, as it is preferable to keep the synchronization signal clearly apart from the payload signal in the frequency domain. In a gigabit Ethernet system, the frequency of the synchronization signal might be 2048 kHz, for example, which is a commonly used frequency reference in current networks. However, it is to be noted here that, depending on the desired implementation, the synchronization signal power may also be above the payload signal power in the frequency domain, or even in the middle of the payload spectrum, if the system is designed to filter the synchronization signal apart from the payload signal.

In most cases the frequency synchronization signal received from the clock source is in digital format and has to be converted into an analog format in order to enable amplitude modulation. This can be easily done by filtering the digital signal through a band-pass filter, for example, whereby the digital signal is converted into a sinusoidal signal.

In the receiver, the incoming combined signal (i.e. the amplitude-modulated payload signal) is supplied to an optical detector which converts the optical signal into an electrical signal. The receiver includes a dedicated reception branch for each of the components of the combined signal. FIG. 3 illustrates one embodiment of a receiver in which the branching off is implemented after a common optical detector 30, which receives the combined signal from the fiber. The synchronization signal is detected in a synchronization branch SB, while the payload signal is detected in a payload branch PB. FIG. 4a, 4b, and 4c illustrate the power spectrum of the (electrical) signal at points D, E, and F of FIG. 3, respectively. In the synchronization branch of the receiver of FIG. 3, the output signal of the optical detector is supplied to a filter 32 which removes the payload signal from the amplitude-modulated signal, whereby only the synchronization signal is obtained from the output of the filter. The filter thus operates as an AM detector. FIG. 3 illustrates a simplified structure of the receiver, where components not essential in view of the invention are omitted. In addition to the common optical detector, the receiver may include a common pre-amplifier stage for the two branches.

In order to obtain the synchronization signal in digital format, the filtered analog signal may be further supplied to an A/D converter (not shown in the figure). Furthermore, if the frequency of the synchronization signal is not high enough, the signal may also be multiplied in a multiplier unit (not shown in the figure) in order to obtain the desired frequency value.

The recovered analog or digital synchronization signal is supplied to a decision-making circuit 34, which compares the level of the synchronization signal to a predetermined threshold and decides whether a valid synchronization signal has been received. The synchronization branch preferably includes separate paths for the synchronization signal and the decision-making, whereby the synchronization signal is supplied from the filter to the decision-making circuit and to a phase-locked loop 35 of the node to synchronize the node to the master clock 14 of the system. In the case of the said two paths, the transmitter decides whether the quality of the synchronization signal is high enough to be transmitted to the optical link, and the decision-making unit only indicates whether a valid synchronization signal has been received or not. The decision-making circuit may also be located between the filter and the phase-locked loop, whereby it gates the signal received if it does not regard the signal as a valid synchronization signal. As the synchronization signal is obtained directly by filtering the output of the optical detector, the detection of the signal and its validity is fast.

In the data branch PB, appropriate filters can be used to remove the synchronization signal from the combined signal, if necessary. Normally, no extra filters are needed to remove the synchronization signal from the combined signal. Since the frequency of the synchronization signal is low as compared to that of the payload signal, the lower threshold frequencies of the receiver units may be so high that the synchronization signal is automatically removed from the combined signal in the data branch. One such unit having inherently a lower limit frequency higher than the frequency of the synchronization signal may be a limiting amplifier 31 shown in the figure. The filtered and amplified payload signal is then supplied to a clock and data recovery circuit (CDR) 33, where the clock and data signals are recovered in a manner known as such. A typical clock and data recovery circuit has a wide bandwidth as compared to the narrow-band synchronization signal, so that the interference caused by the synchronization signal in the said circuit is in any case negligible.

In another embodiment of the invention, the receiver is divided into the two branches at the optical detector 30, as shown in FIG. 5. In this embodiment, the frequency synchronization signal is detected by monitoring the supply current of a photo detector PD in a current sensing circuit 51 and by removing the high frequency payload signal in a filter 52, whereby the synchronization signal is obtained from the output of the said filter. The current sensing circuit typically also includes an amplifier unit for amplifying the signal sensed. The output signal of the photo detector is supplied to the data branch, which typically includes a transimpedance amplifier 53 in the pre-amplifier stage. If necessary in the implementation in question, the low frequency synchronization signal is then removed in a subsequent receiver stage, such as by the limiting amplifier.

Figure 6A:
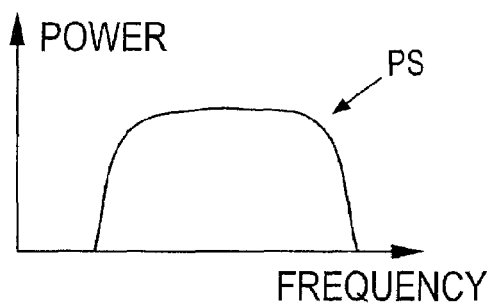
FIGS. 6a, 6b, and 6c illustrate the power spectrum of the signal at three different points in the transmitter in another embodiment of the invention.
Figure 6B:
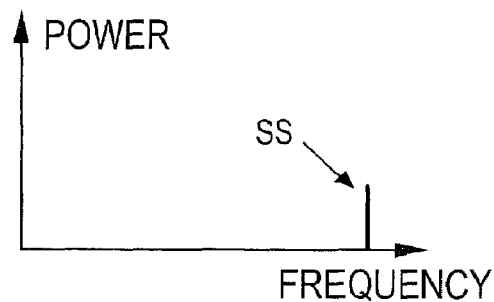
Figure 6C:
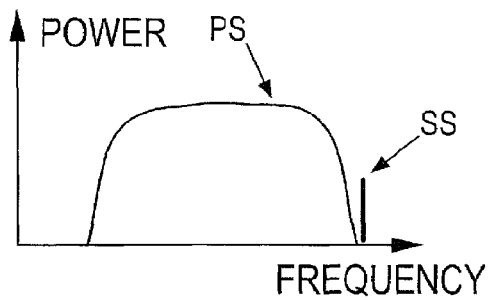

As mentioned above, the synchronization signal power may also be above the payload signal power in the frequency domain, or even in the middle of the payload spectrum, if the system is designed to filter the synchronization signal apart from the payload signal. FIGS. 6a to 6c, which correspond to FIGS. 2a to 2c, respectively, illustrate the power spectra of the signals when the frequency of the synchronization signal is above the payload signal power. The filters 32 and 52 may therefore be low-pass, band-pass, or high-pass filters, depending on the implementation chosen.

Figure 7:
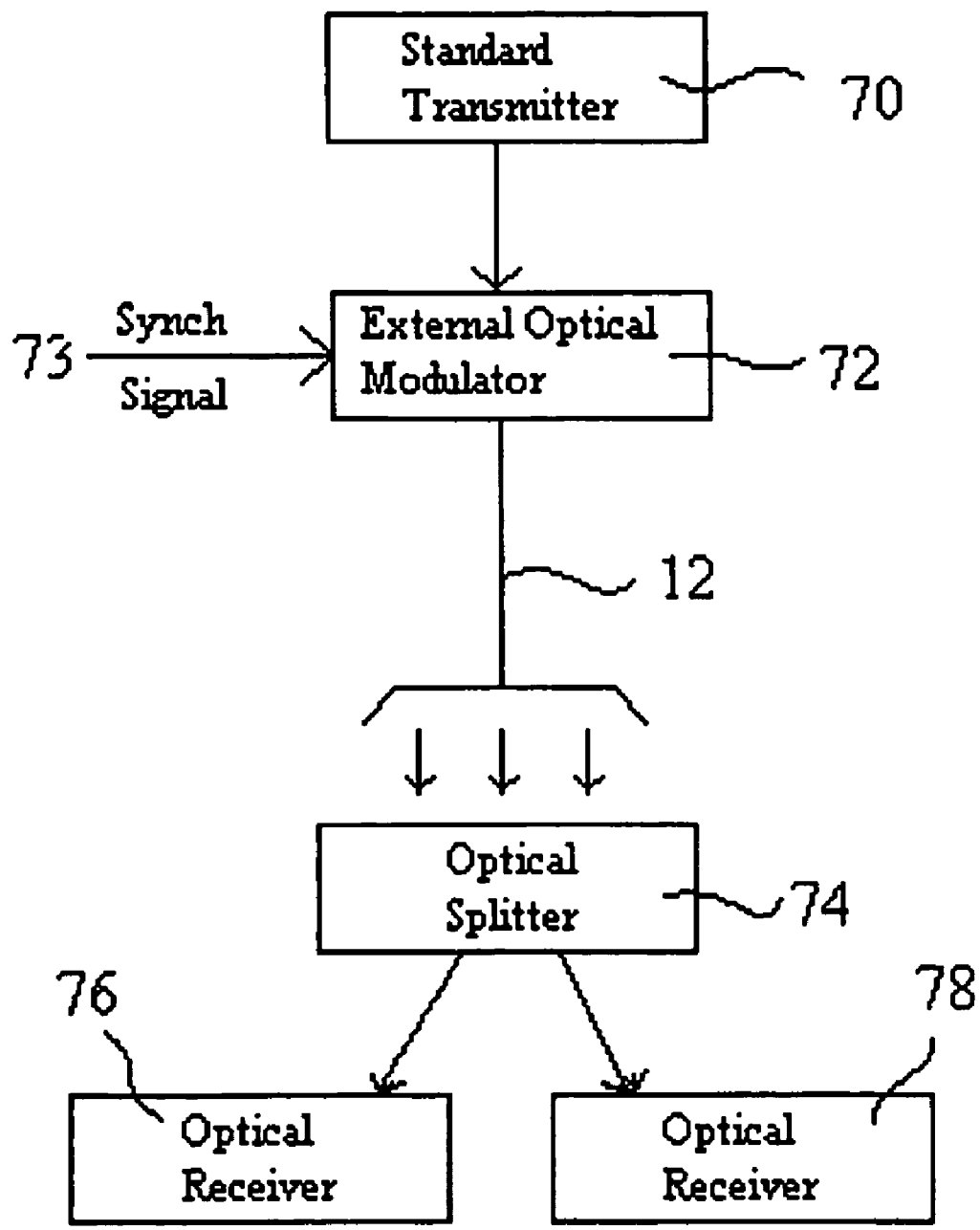
FIG. 7 illustrates an embodiment of the present invention in which the insertion and separation of the synchronization signal are performed in the optical layer.

The invention can also be implemented without changing the standard optical Ethernet transceivers in any way. In these embodiments, an example of which may be seen in FIG. 7. the insertion and separation of the synchronization signal are performed in the optical layer. After the standard transmitter 70 the light is guided to an external optical modulator 72, which then inserts the frequency synchronization signal 73 as a pilot signal by amplitude modulation of the incoming light. The optical modulator 72 is controlled by an electrical signal, i.e. the synchronization signal 73 is supplied as an electrical signal to the said optical modulator 72. The extinction ratio of this external optical modulator 72 is much lower than that of the modulator of the standard transmitter 70 as the modulation depth of the amplitude modulation is typically from 3 to 6 percent. An optical attenuator can also be used as an optical modulator. The detection of the synchronization signal can be performed by splitting the received optical signal into two branches using an optical splitter 74 coupled in front of two optical receivers. The first optical receiver 76 is used to detect the synchronization signal, and the second one optical receiver 78, which is a standard Ethernet receiver, is for the detection of the original payload signal.

The invention can be utilized in various Ethernet-based optical networks. One such environment is a radio access network, where a synchronization signal is needed at the base stations. The optical Ethernet provides a cost-efficient path technology for implementing the radio access network as a high capacity network, whereas the invention provides a cost-efficient way of introducing the distribution of a synchronization signal in that network. The invention may also be utilized in the link between a base station and its antenna site. In this case, amplitude-modulated optical signals according to the invention are transported from the base station to the antenna sites through optical fibers in order to synchronize the antenna sites with a common synchronization reference.

Although the invention was described above with reference to the examples shown in the appended drawings, it is obvious that the invention is not limited to these, but may be modified by those skilled in the art without departing from the scope and spirit of the invention. For example, the invention is not restricted to Ethernet systems, but the same idea can be applied to any optical system which is inherently asynchronous. Furthermore, the amplitude modulation can be implemented with various known methods. A modulator unit of the transmitter may also comprise separate modulators for modulating the payload signal and the bias control signal. The components used in the apparatus may also be changed from those described above. For example, the laser diode used in the transmitter can equally well be a light emitting diode (LED).

The invention claimed is:

1. A receiver arrangement comprising:
   at least one optical detector to receive a combined signal formed by a payload signal amplitude-modulated with a synchronization signal in an optical communication system, the synchronization signal to synchronize network elements in the optical communication system;
   a first reception branch configured to detect the payload signal;
   a second reception branch comprising an amplitude modulation detector to detect the synchronization signal and to obtain a synchronization signal for the receiver arrangement; and
   a decision-making unit to be connected to the amplitude modulation detector the decision-making unit to compare the amplitude of the synchronization signal with a predetermined threshold.

2. The receiver arrangement according to claim 1, wherein said at least one optical detector comprises a single optical detector, an output of which is to be connected to said first and second branches to supply the combined signal to said first and second branches.

3. The receiver arrangement according to claim 1, wherein said amplitude modulation detector comprises a filter to remove the payload signal from the combined signal.

4. The receiver arrangement according to claim 1, wherein said second branch comprises a current sensing circuit to be coupled to an output of said at least one optical detector.

5. A receiver arrangement comprising:
   at least one optical detector to receive a combined signal formed by a payload signal amplitude-modulated with a synchronization signal in an optical communication system, the synchronization signal to synchronize network elements in the optical communication system;
   a first reception branch configured to detect the payload signal; and
   a second reception branch comprising an amplitude modulation detector to detect the synchronization signal and to obtain a synchronization signal for the receiver arrangement,
   wherein the amplitude modulation detector is to be connected to a phase-locked loop to supply the detected synchronization signal to the phase-locked loop.

6. The receiver arrangement according to claim 5, wherein said at least one optical detector comprises a single optical detector, an output of which is to be connected to said first and second branches to supply the combined signal to said first and second branches.

7. The receiver arrangement according to claim 5, wherein said amplitude modulation detector comprises a filter to remove the payload signal from the combined signal.

8. The receiver arrangement according to claim 5, wherein said second branch comprises a current sensing circuit to be coupled to an output of said at least one optical detector.

9. A method comprising:
   optically detecting a combined signal formed by a payload signal amplitude-modulated with a synchronization signal in an optical communication system to obtain a detected signal, the synchronization signal to synchronize network elements in the optical communication system;
   detecting said payload signal and said synchronization signal, wherein detecting said synchronization signal comprises performing amplitude demodulation on said detected signal to obtain an amplitude-demodulated signal; and
   comparing the amplitude-demodulated signal to a predetermined threshold value.

10. The method of claim 9, further comprising:
    outputting a decision result to indicate whether or not a valid synchronization signal has been received.

11. The method of claim 9, further comprising:
    filtering the combined signal to remove the payload signal from the synchronization signal.

12. The method of claim 9, wherein performing amplitude demodulation comprises sensing a current received resulting from said optically detecting.

13. A method comprising:
    optically detecting a combined signal formed by a payload signal amplitude-modulated with a synchronization signal in an optical communication system to obtain a detected signal, the synchronization signal to synchronize network elements in the optical communication system;
    detecting said payload signal and said synchronization signal, wherein detecting said synchronization signal comprises performing amplitude demodulation on said detected signal to obtain an amplitude-demodulated signal; and supplying the amplitude-demodulated signal to a phase-locked loop.

14. The method of claim 13, further comprising:

obtaining a decision result based on the amplitude-demodulated signal to indicate whether or not a valid synchronization signal has been received.

15. The method of claim 13, further comprising:

filtering the combined signal to remove the payload signal from the synchronization signal.

16. The method of claim 13, wherein performing amplitude demodulation comprises sensing a current received resulting from said optically detecting.

17. A system comprising:

an optical transmitter unit to accept a payload signal and a synchronization signal that is configured to synchronize network elements in an optical communication system and to output a combined optical transmission signal in which the payload signal is amplitude-modulated by the synchronization signal;

at least one optical detector to receive the combined optical transmission signal;

a first reception branch configured to detect the payload signal;

a second reception branch comprising an amplitude modulation detector to detect the synchronization signal and to obtain a synchronization signal for a receiver; and a decision-making unit to be connected to the amplitude modulation detector, the decision-making unit to compare the amplitude of the synchronization signal with a predetermined threshold.

18. A system comprising:

an optical transmitter unit to accept a payload signal and a synchronization signal that is configured to synchronize network elements in an optical communication system and to output a combined optical transmission signal in which the payload signal is amplitude-modulated by the synchronization signal;

at least one optical detector to receive the combined optical transmission signal;

a first reception branch configured to detect the payload signal;

a second reception branch comprising an amplitude modulation detector to detect the synchronization signal and to obtain a synchronization signal for a receiver, wherein the amplitude modulation detector is to be connected to a phase-locked loop to supply the detected synchronization signal to the phase-locked loop.

* * * * *